United States Patent [19]

Fernando et al.

[11] Patent Number: 5,045,289
[45] Date of Patent: Sep. 3, 1991

[54] FORMATION OF RARE EARTH CARBONATES USING SUPERCRITICAL CARBON DIOXIDE

[75] Inventors: Quintus Fernando, Tucson, Ariz.; Naohisa Yanagihara, Zacopan, Mexico; James T. Dyke, Santa Fe, N. Mex.; Krishna Vemulapalli, Tuscon, Ariz.

[73] Assignee: Research Corporation Technologies, Inc., Tucson, Ariz.

[21] Appl. No.: 416,885

[22] Filed: Oct. 4, 1989

[51] Int. Cl.$^5$ ............................................ C01F 19/00
[52] U.S. Cl. .................... 423/21.1; 423/263; 423/419 R
[58] Field of Search ............... 423/263, 21.1, 419 R

[56] References Cited

U.S. PATENT DOCUMENTS

| | | | |
|---|---|---|---|
| 1,279,257 | 9/1918 | Chase | 423/21.1 |
| 2,013,767 | 9/1935 | Schulze | 423/21.1 |
| 2,166,702 | 7/1939 | Blumenfeld | 423/21.1 |
| 2,327,992 | 8/1943 | Blumenfeld | 423/21.1 |
| 2,394,586 | 2/1946 | Ballard et al. | 423/21.1 |
| 2,722,471 | 11/1955 | Hirsch et al. | 423/21.1 |
| 2,735,747 | 2/1956 | Kasey | 423/21.1 |
| 2,783,125 | 2/1957 | de Rohden et al. | 423/21.1 |
| 2,805,928 | 9/1957 | Kasey | 423/21.1 |
| 2,811,411 | 10/1957 | Calkins | 423/21.1 |
| 2,815,264 | 12/1957 | Calkins et al. | 423/21.1 |
| 2,849,286 | 8/1958 | Welt et al. | 423/21.1 |
| 2,900,231 | 8/1959 | Kremers et al. | 423/21.1 |
| 2,988,421 | 6/1961 | Kemp et al. | 423/21.1 |
| 3,049,403 | 8/1962 | Krumholz | 423/21.1 |
| 3,092,449 | 6/1963 | Bril et al. | 423/21.1 |
| 3,104,970 | 9/1963 | Downing et al. | 75/610 |
| 3,111,375 | 11/1963 | Gottdenker et al. | 423/21.5 |
| 3,112,990 | 12/1963 | Krumholz | 423/21.5 |
| 3,252,754 | 5/1966 | Kraitzer | 423/21.1 |
| 3,264,093 | 8/1966 | Sump | 75/10.47 |
| 3,353,928 | 11/1967 | Woyski et al. | 423/21.1 |
| 3,375,061 | 3/1968 | Healy et al. | 423/21.1 |
| 3,453,069 | 7/1969 | Sherrington | 423/21.1 |
| 3,486,843 | 12/1969 | Smetana et al. | 423/21.1 |
| 3,492,084 | 1/1970 | Trombe et al. | 423/21.1 |
| 3,515,509 | 6/1970 | Rombau | 423/21.1 |
| 3,619,128 | 11/1971 | Angstadt | 423/21.1 |
| 3,692,671 | 9/1972 | Recht et al. | 423/263 |
| 3,791,815 | 2/1974 | Taylor | 423/21.1 |
| 3,812,233 | 5/1974 | Duncan | 423/21.1 |
| 3,855,017 | 12/1974 | Schueler | 148/105 |
| 3,925,062 | 12/1975 | Trombe et al. | 423/21.1 |
| 4,439,232 | 3/1984 | Ghandehari | 75/10 R |
| 4,457,812 | 7/1984 | Rudo | 204/66 |
| 4,543,190 | 9/1985 | Modell | 210/721 |
| 4,578,242 | 5/1986 | Sharma | 420/83 |
| 4,675,101 | 6/1987 | Warzinksi | 208/311 |
| 4,767,455 | 8/1988 | Jourdan | 75/610 |

OTHER PUBLICATIONS

The Synthesis of Crystalline Rare Earth Carbonates, Nagashima et al., in *Bulletin of the Chem. Soc. of Japan*, 46, 162–6 (1973).
"Uber Kalium—Und Rubidiumamidometallate Des Europiums, Yttriums Und Ytterbiums, K$_3$M(NH$_2$)$_6$Und Rb$_3$M(NH$_2$)$_6$," *Journal of the Less-Common Metals*, 85 (1982), 97–110.
"Extracting Foodstuffs Using Supercritical CO$_2$", *The Chemical Engineer*, Jun. 1986, pp. 73–79.
"The Growing Interest in Rare Earth Metals", *Journal of Metals*, May 1988, pp. 21–31.
"Metallurgical Applications of the Lanthanides and Yttrium", Lanthology 553, The Lanthanides and Yttrium, Metallurgical Applications, pp. 1–10.

*Primary Examiner*—Gary P. Straub
*Assistant Examiner*—Stuart L. Hendrikson
*Attorney, Agent, or Firm*—Scully, Scott, Murphy & Presser

[57] ABSTRACT

The invention relates to a process for the rapid, high yield conversion of select rare earth oxides or hydroxides, to their corresponding carbonates by contact with supercritical carbon dioxide.

18 Claims, 4 Drawing Sheets

FORMATION OF RARE EARTH CARBONATES USING SUPERCRITICAL CARBON DIOXIDE

This invention was made, in part, with Government support under subcontract number 9-XFE-5772-K1 awarded by the Los Alamos National Laboratory. The Government has certain rights in the invention.

BACKGROUND OF THE INVENTION

1. Field of the Invention

This invention relates to a process for selectively forming rare earth carbonates from a mixture of rare earth oxides or hydroxides. In particular, oxides or hydroxides of lanthanum, neodymium, samarium, europium, gadolinium, dysprosium, holmium, promethium, thulium, and lutetium are found to be rapidly converted with high yield, to their respective carbonates using the process of the invention. This technique finds use in facilitating the extraction of these materials from rare earth containing mineral ores by providing a scheme for separating these particular rare earths from other rare earth and rare earth-like materials which do not react to form carbonates.

2. Description of the Prior Art

The rare earths, also known as the lanthanides or as lanthanons, and meaning here those elements having atomic numbers 57 to 71, are substances finding utility in high strength alloys, permanent magnets, petroleum refining, catalysis, phosphors and more recently, in high temperature superconductor materials. As demand for these materials grows, the availability of the rare earths and rare earth containing compounds becomes an ever increasing concern. While proven rare earth reserves are believed sufficient to meet current and expected demand, the methods of extracting the rare earths from source mineral ores such as monazite, bastnasite and xenotime, as well as processes for separating and isolating the various lanthanons from each other are beset with difficulties due to the extreme chemical and physical similarity occuring within the lanthanide family.

Ore extraction processes removing rare earths and rare earth containing compounds from an ore matrix are known which involve the initial formation of rare earth oxides or hydroxides by the use of heat, or by reacting the crushed ore with suitable solvents. The rare earth oxides or hydroxides thus formed are then further separated into various fractions of rare earth containing material. Individual rare earth compounds are eventually isolated by solvent extraction or ion exchange techniques, which have, by and large, replaced older separation methods such as fractional crystallization.

It has been these isolation and separation steps of rare earth compounds which have proven to be the most troublesome. The electronic configuration underlying the lanthanide family permits only small changes in atomic and ionic radii from one rare earth element to the next and nearly all the lanthanides are trivalent, the predominant oxidation state being +3. Accordingly, this physical and chemical proximity has required the use of separation and isolation techniques that are time consuming, expensive, and which quite often result in less than optimal yields.

To facilitate the separation of the rare earth compounds into various fractions, and to make easier the later isolation of them as from among each other, these rare earth oxides or hydroxides are often converted into rare earth carbonates. Carbonates are useful in that certain rare earths in the form of carbonates, have either more or less relative solubility in certain media. Carbonates are also readily converted into other compounds and are more easily stored.

The formation of lanthanide carbonates in order to facilitate processing is currently accomplished by one of several known methods, each of which has associated drawbacks. First, lanthanide carbonates may be precipitated from solutions which contain lanthanide ions by the addition of alkali carbonates or bicarbonates. However, in the presence of alkali metal ions, double salts, which may be represented as $M_2(CO_3) \cdot K_2CO_3 \; nH_2O$, where M denotes a rare earth element, are often formed. This is undesirable if pure lanthanide carbonates that are free of extraneous cations are required.

A somewhat more convenient method for the preparation of lanthanide carbonates is the hydrolysis of lanthanide trichloracetates in a homogenous phase reaction which can be depicted as:

$$2M(Cl_3CCOO)_3 + (x+3)H_2O \rightarrow M_2(CO_3)_3 \cdot xH_2O + 3CO_2 + 6CHCl_3$$

where again, M denotes the particular rare earth element involved. By the use of this method, as well as several of its known variations, all the lanthanide carbonates, $M_2(CO_3)_3 \cdot xH_2O$, have been synthesized, where $x=8$ for the light lanthanides of low atomic number (typically elements having atomic numbers 57 to 64) and $2 < x3$ for the heavy high atomic number elements (typically elements having atomic numbers 65 to 71). The homogeneous phase hydrolysis however has several important drawbacks—namely, the lanthanide is not completely precipitated as the carbonate and the composition of the precipitate is dependent upon the conditions under which the precipitation reaction is carried out.

Lastly, lanthanide carbonates have been prepared by passing carbon dioxide through a suspension of lanthanide oxides, or hydroxides, in water. For example, U.S. Pat. Nos. 3,092,449 and 3,492,084 describe the formation of rare earth carbonates by bubbling carbon dioxide gas at temperatures and pressures which are at, or are only slightly above ambient conditions, through such a suspension. However, the conversion of the oxide, or hydroxide, into the carbonate is extremely slow and the reactions have been found to occur over a period of many hours to several days. Further, in many instances the yield of carbonates is low; the final reaction product being a mixture of the oxide or hydroxide and the carbonate. These shortcomings are overcome in the present invention where carbonate formation occurs with carbon dioxide that is in a supercritical state; that is at a temperature and pressure above 31° C. and 72.9 atmospheres, respectively.

With respect to supercritical fluids, they are, as such, known primarily for their ability to act as extractants. In this regard, their transport properties are found to be between those of a gas and a liquid. Indeed, they are commonly thought of and characterized as either dense gases or, alternatively, as superheated liquids. For a fluid above its critical point, slight changes in temperature and pressure cause extremely large changes in density and thus dissolving power, which of course affects the ability to extract solute. By returning the fluid to a subcritical state, the extracted solute is removed in what has been characterized as a form of retrograde condensation. Supercritical carbon dioxide, the fluid of the present invention, has been widely used in this extractive capacity by the food industry to extractively remove, for example, caffeine from coffee, or acids from hops. Inorganic substances, such as those found in minerals, have also been extracted, as described in U.S. Pat. No. 4,457,812, by supercritical solvents which normally contain chloride. These solvents act to "take-up" and remove the various inorganic portions from the mineral.

Of more functional relevance to the present invention is the lesser-known ability of supercritical fluids to act as reactants, rather than as extractants. With regard to organic chemicals, oxidation of organics through the use of supercritical water is shown by U.S. Pat. No. 4,543,190. In the field of inorganics, which is more germane to the present invention, the preparation of potassium and rubidium amido-metallates of europium, yttrium and ytterbium, $K_3M(NH_2)_6$ and $Rb_3M(NH_2)_6$, has been described in "Uber Kalium-Und Rubidiumamidometallate Des Europiums, Yttriums Und Ytterbiums, $K_3M(NH_2)_6$ Und $Rb_3M(NH_2)_6$", *Journal of the Less-Common Metals*, 85 (1982) 97–110. These compounds were prepared in well-crystallized form by the reaction of the corresponding metals in supercritical ammonia acting as reactant and solvent. Supercritical carbon dioxide, acting as a reactant as in the present invention, has not been described in the art.

SUMMARY OF THE INVENTION

The present invention overcomes the above inadequacies in rare earth processing. The invention is directed to the rapid, high yield synthesis of rare earth carbonates, particularly those formed from trivalent lanthanum, neodymium, samarium, europium, gadolinium, dysprosium, holmium, promethium, thulium, and lutetium by the reaction of an aqueous suspension of the lanthanide oxide, $M_2O_3$, (where M denotes the rare earth element), with carbon dioxide under supercritical conditions, meaning under conditions at or over the critical temperature and at or over the critical pressure. The critical temperature for carbon dioxide is 31° C.; the critical pressure is 72.9 atomspheres. It has been surprisingly found that normal carbonate yields of 95% or better were obtained after the process of the invention was carried out for only 1 hour.

DETAILED DESCRIPTION OF THE INVENTION

The process of the invention provides a rapid method of obtaining a high yield synthesis of rare earth carbonates from certain select rare earths in the trivalent (+3) state as normally found in, for example, rare earth oxides or hydroxides, from other rare earths or rare earth-like materials. Rare earth-like materials are those compounds associated with, normally present in, or formed during the processing of, the various source ores from which the lanthanides are derived. These materials, while not true rare earths are analogous to the lanthanides in structure and behavior and are therefore of concern during processing and separation. Included among these rare earth-like materials are compounds formed from the actinides, (elements of atomic numbers 89 to 103, such as thorium), titanium, yttrium, and zirconium. In general, these elements, which form the rare earth-like compounds, are present in their +4 oxidation state; examples include $ThO_2$ and $ZrO_2$. The process of the invention has utility in the quantitative precipitation of the particular reactive lanthanides in the +3 oxidation state and in the separation of these reactive lanthanides from, for example, lanthanides in the +4 oxidation state.

Generally speaking, the formation of rare earth carbonates, as contemplated by the invention, is accomplished by reacting an aqueous suspension of rare earth oxides, or hydroxides, with carbon dioxide under supercritical conditions. In particular, the trivalent oxides or hydroxides of lanthanum (La), neodymium (Nd), samarium (Sm), europium (Eu), gadolinium (Gd), dysprosium (Dy), holium (Ho), promethium (Pm), thulium (Tm), and lutetium (Lu) can be quickly converted into their respective carbonates by contact with carbon dioxide at, for example, a pressure of about 100 atmospheres and a temperature of about 40° C. High yields of 95% or better are obtained in approximately one hour. These particular rare earth oxides or hydroxides can thus be readily separated from the oxides or hydroxides of rare earth or rare earth-like elements such as praseodymium (Pr), terbium (Tb), erbium (Er), ytterbium (Yb), zirconium (Zr), cerium (Ce), and thorium (Th) because these latter rare earth and rare earth-like oxides (or hydroxides) do not form carbonates under the above conditions despite the fact that some are in the trivalent state. It is believed that the oxides of these elements are particularly complex and as such do not readily react under the conditions of the invention.

This discovery has ready application in the selective extraction and separation of these enumerated rare earth oxides or hydroxides from source ores used in the practical production of the various rare earths.

For example, monazite, a light-lanthanide thorium phosphate $MPO_4Th_3(PO_4)_4$, and bastnasite, a light-lanthanide fluoride carbonate, $MFCO_3$, are the main minerals from which the lighter lanthanides (elements 57 to 64), are usually extracted. The heavier lanthanides (elements 65 to 71), and yttrium, can be obtained, for example, from the mineral xenotime. Another source of these materials include uranium mining tailings which contain an elemental profile similar to that found in xenotime.

In processing these various ores to obtain rare earth materials, a stage is normally reached wherein the rare earths are present in their oxide or hydroxide form and are thus amenable to treatment using the process of the present invention. For example, when monazite is processed industrially it is subjected to typical mineral ore processing techniques, for example crushing, flotation and/or leaching; the leaching normally occuring with an alkali metal hydroxide such as sodium hydroxide. All of these processing techniques are known in the art. After leaching the monazite, soluble phosphates are formed and rare earth oxides or hydroxides are precipitated. It is these precipitated, or slurried, monazite-derived solids upon which the present invention has preferred application and it is from this point the present invention shall be described in detail.

The precipitated, or slurried, solids, wherein the rare earths are present in oxide and/or hydroxide form, are placed in deionized water in an amount of water sufficient to form a suspension. The suspension is then placed into an autoclave or other airtight vessel equipped for heating and agitation under high pressure. The vessel is also equipped, by way of piping and valving, for the introduction of carbon dioxide. The suspension of the oxides and/or hydroxides and water is then frozen by, for example, immersion of the vessel into an ice bath mixture such as, for example, an acetone-dry ice mixture.

Subsequent to this freezing, liquid carbon dioxide is introduced into the vessel and after a short time, 15 minutes for example, the vessel is removed from the freezing means and gently heated in, for example, a water bath. Reaction temperature may be measured by a thermocouple located within the vessel. When a temperature over and above the critical temperature of carbon dioxide, i.e. 31° C., is reached, the contents of the vessel are pressurized. The compression continues until a pressure greater than the critical pressure of carbon dioxide, i.e. 72.9 atmospheres, is obtained. Preferrably, the temperature is about 40° C. when pressurization commences with the latter continuing until a preferred pressure of 1470 psi is obtained or most preferrably until 2800 psi is obtained. Mechanical agitation means may also be used once pressurization begins or after it is completed.

Significant yields of carbonates are obtained after approximately 10 minutes. Preferrably, the reaction proceeds for about one hour at which time the stirring, if any, is ceased and the vessel is allowed to cool to ambient temperature. Pressurized carbon dioxide is released from the vessel through appropriate valves and the reaction solution is then filtered. The solids which remain are then washed with deionized water and dried in air. These solids comprise both the rare earth materials which have reacted to form carbonates and also those rare earth and/or rare earth-like materials which did not react, or did not react significantly, and have thus remained in their oxide or hydroxide form.

The solid precipitate obtained above is next treated with a dilute acid such as HCl in a concentration of between 0.1 and 3.0M. Preferrably 0.5M HCl is used at ambient temperature and pressure. This acid treatment solubilizes the rare earth carbonates, leaving the unreacted rare earth and rare earth-like oxides and/or hydroxides behind in their solid form. The resultant solution is filtered and the carbonate fraction can be further broken down into individual rare earth carbonates by techniques such as ion exchange or solvent extraction which are well known in the art and will not be discussed further here.

Other sources of rare earths, such as bastnasite ore are also subject to the process of the invention so long as at some stage in the processing operation the rare earths are present in their oxide or hydroxide form. Bastnasite, due to the presence of fluorine compounds, is more difficult to work with than monazite, as described, because of the tendency of the fluorine to form noxious gases. Therefore, in practicing the process of the invention on bastnasite precautions must be taken to protect against these difficulties. The basic procedures regarding the formation of carbonates once the rare earth oxides or hydroxides stage is arrived at, are otherwise the same with all rare earth-containing ore with any modifications being minor and readily determined by those in the art.

Using the described procedure for processing a slurry of oxides and hydroxides which were obtained from monazite ore which, in admixture, contained $La_2O_3$(49.72%), $Nd_2O_3$(20.02%), $Tb_4O_7$(5.08%), $Yb_2O_3$(5.10%) and $ThO_2$(20.07%), a high degree of separation of La and Nd was obtained—namely, between 94.3% and 99.8%. Notably, the other rare earth or rare earth-like oxides in this mixture are among those which do not react to form carbonates with supercritical carbon dioxide or by the process of the invention.

The following example will illustrate and describe without limiting the invention. The example illustrates the carbonation process of the invention using essentially pure rare earth oxides.

EXAMPLE

Synthesis of Lanthanide Carbonates

The oxides of the following rare earths and rare earth-like materials, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Yb_2O_3$ and $ZrO_2$, were obtained from Alfa Division, Danvers, MA, and were 99.9% pure. The carbon dioxide used in this example had a purity of 99.8% and was used without any further purification.

The carbonates were synthesized in a 300 cm$^3$ high pressure autoclave fitted with a mechanical stirrer (Autoclave Engineers Inc., Model 72-4017-2). Outlets were provided in the lid of the autoclave for fitting a high pressure gauge, inlet and exit tubes and a thermocouple. The inlet tube was connected to an intensifier into which liquid carbon dioxide could be introduced from a carbon dioxide cylinder and compressed to a desired pressure with the aid of a Hills-McCanna compressor.

The carbonate synthesis was carried out as follows: 1.0 g of the oxide was placed in the autoclave and 25 ml of deionized distilled water was added to form a suspension. The autoclave was immersed in an acetone-dry ice mixture and the suspension of the oxide in water was frozen. Liquid carbon dioxide was then introduced into the autoclave and after 15 minutes the autoclave was removed from the acetone-dry ice mixture and placed in a water bath which was gently heated. The critical temperature of carbon dioxide is 31° C.; the critical pressure, 72.9 atmospheres. Supercritical conditions as contemplated by the invention involve temperatures and pressures which supercede both of the above. The temperature of the contents of the autoclave was measured by a thermocouple located at the bottom of the autoclave. When a temperature of 40° C. was obtained the compressor was started and the carbon dioxide was compressed to 2800 psi and the mechanical stirrer was started. After about one hour, the stirring was stopped and the autoclave was allowed to cool to room temperature. The valve in the exit tube was opened carefully and the pressurized carbon dioxide was released. The solution in the autoclave was filtered and the solid precipitate was washed with water and dried in air.

The carbonates prepared by the above procedure are listed in Table 1.

TABLE 1

Percentage Yields of Lanthanide Carbonates Formed by the Reaction of the Oxides with Supercritical Carbon Dioxide, (Reaction conditions: Oxide:$H_2O$ ratio = 0.04; reaction time 1 hr; temperature = 40° C.; pressure = 2800 psi).

| Element | Oxide used in synthesis | % Yield of Carbonate |
|---|---|---|
| Lanthanum | $La_2O_3$ | 97.6 |
| Cerium | $CeO_2$ | — |
| Praseodymium | $Pr_6O_{11}$ | — |
| Neodymium | $Nd_2O_3$ | 95.4 |
| Samarium | $Sm_2O_3$ | 97.2 |
| Europium | $Eu_2O_3$ | 96.9 |
| Gadolinium | $Gd_2O_3$ | 97.1 |
| Terbium | $Tb_4O_7$ | — |
| Dysprosium | $Dy_2O_3$ | 96.9 |
| Holmium | $Ho_2O_3$ | 96.3 |
| Erbium | $Er_2O_3$ | — |
| Ytterbium | $Yb_2O_3$ | — |
| Zirconium | $ZrO_2$ | — |
| Calcium | $CaO$ | 99.3 |

The carbonate content of the solids was determined as follows: a sample of the carbonate was weighed and placed in a reaction vessel and 25 ml of water was added and the suspension was stirred with a magnetic stirrer. A syringe containing a solution of 0.5 M dilute HCl was used to add the HCl solution through the septum into the reaction vessel. The carbon dioxide liberated was collected in the gas buret over water previously saturated with $CO_2$. The system was tested by the analysis of pure dry $Na_2CO_3$. Satisfactory results were obtained by this method for the analysis of 100–140 mg of $Na_2CO_3$ and the error in these determinations was −1.3%. The percentage metal in the carbonates was determined by an EDTA titration with Arsenazo and indicator. The number of molecules of water associated with each carbonate was calculated and not determined directly. The results are presented in Table 2 below. The percentage yield of each carbonate was calculated on the basis of the formula that was determined for each of the carbonates. The oxides of cerium, praseodymium, terbium, erbium, ytterbium, and zirconium either did not form carbonates or gave very low yields of carbonates.

TABLE 2

Analyses of Lanthanide Carbonates

|  | M (%) Calcd. | M (%) Found | $CO_2$ (%) | $H_2O^{(a)}$ (%) | Mole Ratio $CO_3$:M | Mole Ratio $H_2O$:M |
|---|---|---|---|---|---|---|
| $La_2(CO_3)_3.5 H_2O$ | 50.7 | 50.9 | 23.0 | 17.7 | 1.43 | 2.68 |
| $Nd_2(CO_3)_3.2 H_2O$ | 57.2 | 58.2 | 25.8 | 6.6 | 1.45 | 0.91 |
| $Sm_2(CO_3)_3.2 H_2O$ | 58.2 | 58.2 | 24.8 | 8.0 | 1.46 | 1.15 |
| $Eu_2(CO_3)_3.2 H_2O$ | 58.5 | 58.1 | 24.6 | 8.4 | 1.46 | 1.22 |
| $Gd_2(CO_3)_3.2 H_2O$ | 59.3 | 59.3 | 24.2 | 7.7 | 1.46 | 1.13 |
| $Dy_2(CO_3)_3.2 H_2O$ | 60.1 | 60.5 | 23.6 | 7.3 | 1.44 | 1.09 |
| $Ho_2(CO_3)_3.2$ | 60.4 | 61.0 | 23.3 | 7.2 | 1.43 | 1.08 |

$^{(a)}$Calculated as: $H_2O$ (%) = 100 − [M(%) + Carbonate (%)]

The infrared spectra of KBr pellets of the lanthanide carbonate were recorded with a Perkin Elmer 983 infrared spectrophotometyer. The infrared spectra of the lanthanide carbonates were determined and the observed frequencies are given in Table 3 below.

TABLE 3

Observed Infrared Frequencies of Lanthanum Carbonates.

| Carbonates | O—H stretching ($cm^{-1}$) | C—O asymm. stretch. ($cm^{-1}$) | C—O sym. stretch. ($cm^{-1}$) | $CO_3$ out of plane deformation ($cm^{-1}$) | $CO_3$ rocking ($cm^{-1}$) |
|---|---|---|---|---|---|
| Lanthanum | 3413 | 1479 | 1085 | 838 | 746 |
|  |  | 1398 |  |  | 684 |
| Neodymium | 3413 | 1485 | 1120 | 838 | 750 |
|  |  | 1416 | 1071 |  | 682 |
| Samarium | 3411 | 1493 | 1088 | 847 | 754 |
|  |  | 1414 | 1070 | 837 | 684 |
| Europium | 3407 | 1503 | 1086 | 847 | 755 |
|  |  | 1415 | 1061 | 837 | 684 |
| Gadolinium | 3407 | 1503 | 1094 | 847 | 758 |
|  |  | 1416 | 1066 | 838 | 686 |
| Dysprosium | 3409 | 1503 | 1101 | 870 | 760 |
|  |  | 1421 | 1076 | 836 | 687 |
| Holmium | 3403 | 1513 | 1096 | 846 | 761 |
|  |  | 1421 | 1065 | 836 | 687 |

The $CO_2$ liberated by the action of HCl on the carbonate was separated on a 6 ft. column of Porapack-Q at 75° C. with helium gas as a carrier.

The example illustrates that the oxides of lanthanum, neodymium, samarium, europium, gadolinium, dysprosiuim, and holmium as well as calcium oxide, were essentially completely converted into their respective carbonates. Significantly, the oxides of praseodymium, terbium, erbium, ytterbium, zirconium and cerium either did not react at all or reacted only to the extent that conversion into the carbonate was negligibly small. It was further observed that only a small amount of $CO_2$ was evolved when the reaction products obtained with the oxides of Pr, Tb, Er, and Yb were treated with dilute HCl. Therefore, under the process conditions of the invention as employed above, these oxides gave very low yields of carbonates.

Of the oxides which significantly reacted, lanthanum carbonate was isolated as the pentahydrate, whereas the carbonates of Nd, Sm, Eu, Gd, Dy, and Ho were isolated as the dihydrates. The degree of hydration of the lanthanum carbonate depends on the conditions employed for drying the precipitated carbonate. It is believed that the number of water molecules associated with lanthanum carbonate vary from 3 to 5.5. The infrared spectra of the lanthanide carbonates are found to be sensitive to the degree of hydration. The effect of the association of 5 molecules of water with lanthanum carbonate is evident in the infrared spectrum of the compound, as indicated in Table 3. The C—O asymmetric stretch in the lanthanum carbonate pentahydrate spectrum is broadened considerably and only one relatively broad band is found for the C—O symmetric stretch.

The effect that factors such as temperature, pressure, initial amount of water added, and time of reaction had on the percentage yield of lanthanide carbonates was determined representatively by the use of a suspension of $Nd_2O_3$ in $H_2O$. No attempt was made to control the initial pH by the use of a buffer solution because the cations in the buffer components would, most probably, have formed double salts with the lanthanide carbonate. The initial pH, therefore, was controlled primarily by the dissolved carbon dioxide.

Figure 1:
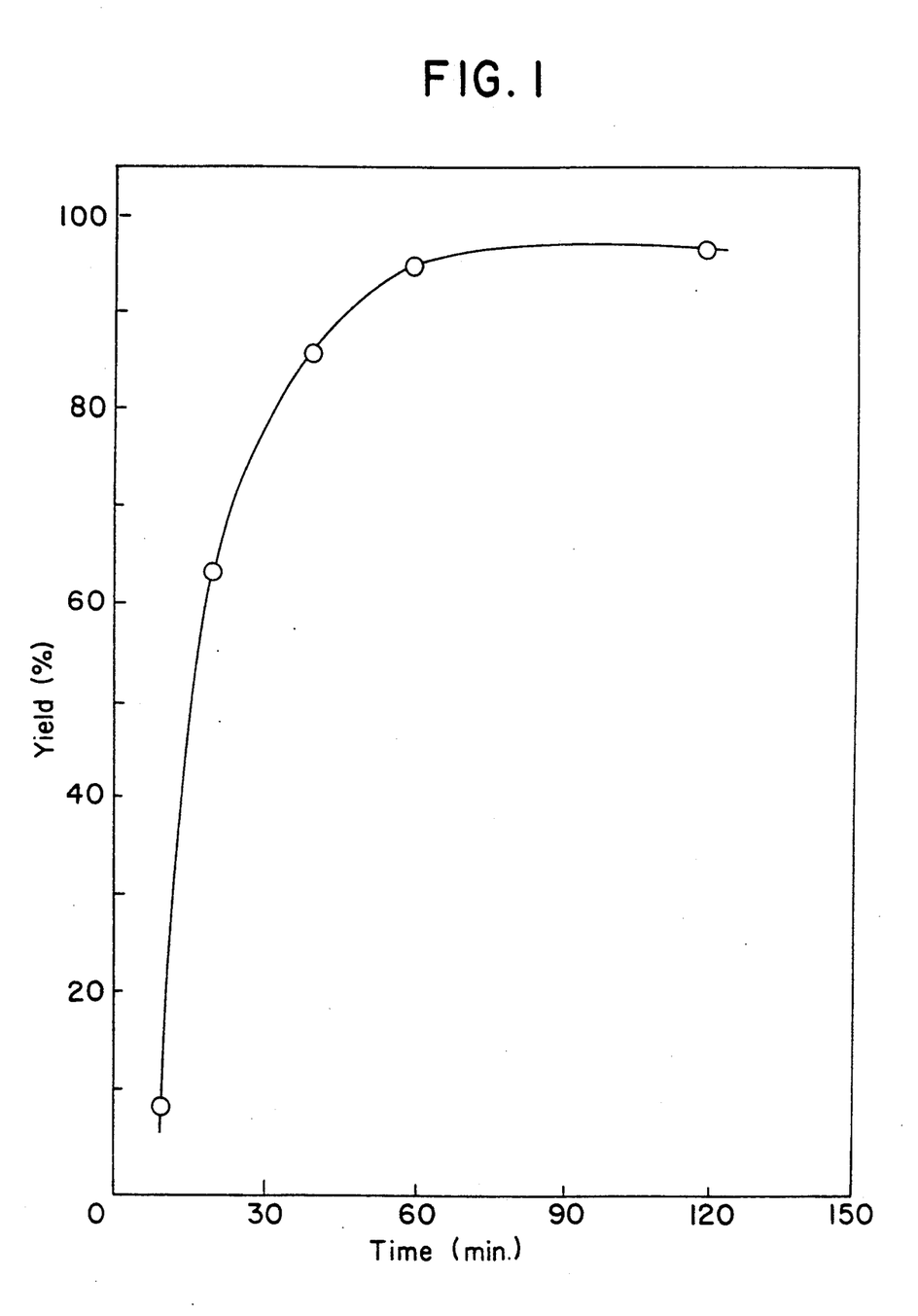
FIG. 1 is a plot of the percentage yield of neodymium carbonate obtained by the practice of the present invention as a function of reaction time; the reaction of interest occurring between neodymium oxide and carbon dioxide at a temperature of 40° C., a pressure of 2800 psi and a neodymium oxide to water ratio of 0.04.

The effect of time on the percentage yield, calculated for the formation of $Nd_2(CO_3)_3 \cdot 2H_2O$ is shown in FIG. 1. In this regard, the initial Nd ratio was kept constant, (1 g $Nd_2O_3$ and 25 ml $H_2O$ ), and the reaction was carried out at 40° C. and 2800 psi. As apparent from FIG. 1, a yield of nearly 80% neodymium carbonate was reached in just 30 minutes, thus demonstrating the rapidity and high yield of the reaction over the carbonation techniques of the prior art. Indeed, after a reaction time of only 10 min, a 10% yield of $Nd_2(CO_3)_3 \cdot 2H_2O$ was obtained. Optimal time for maximized yield is approximately one hour.

Figure 2:
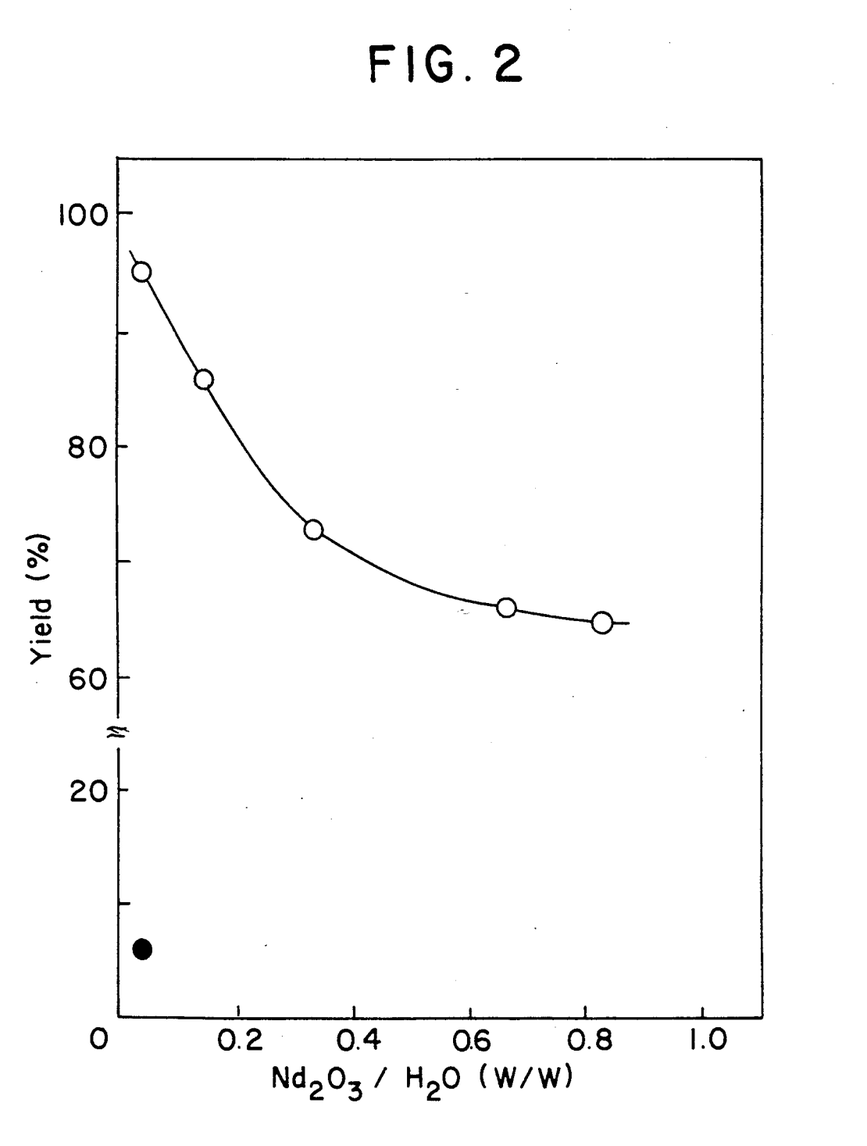
FIG. 2 illustrates the effect that water content has on the formation of neodymium carbonate by a graph of percentage yield of neodymium carbonate as a function of various neodymium oxide to water ratios; the reaction of interest occurring between the neodymium oxide and carbon dioxide at a temperature of 40° C. and a pressure of 2800 psi. Reaction time was 1 hour.

As the practice of the invention requires that the rare earth oxides or hydroxides be suspended in water, the effect that various amounts of water had in forming the rare earth carbonate, here neodymium carbonate, was investigated. The results appear in FIG. 2. When the w/w (weight/weight) ratio of $Nd_2O_3:H_2O$ was varied from 0.04 up to 0.83, at a constant temperature of 40° C. and pressure of 2800 psi, the percentage yield of neodymium carbonate, decreased, thus indicating that the higher the initial amount of water, the higher the yield. When acetone was used instead of water, the yield decreased dramatically, as illustrated in FIG. 2, even though the solubility of $CO_2$ in acetone at 20° C. and 1 atm is 7.5 times the solubility of $CO_2$ in water. When the reaction was carried out with the solid $Nd_2O_3$ and supercritical carbon dioxide in the absence of water, the yield was only 4%.

Figure 3:
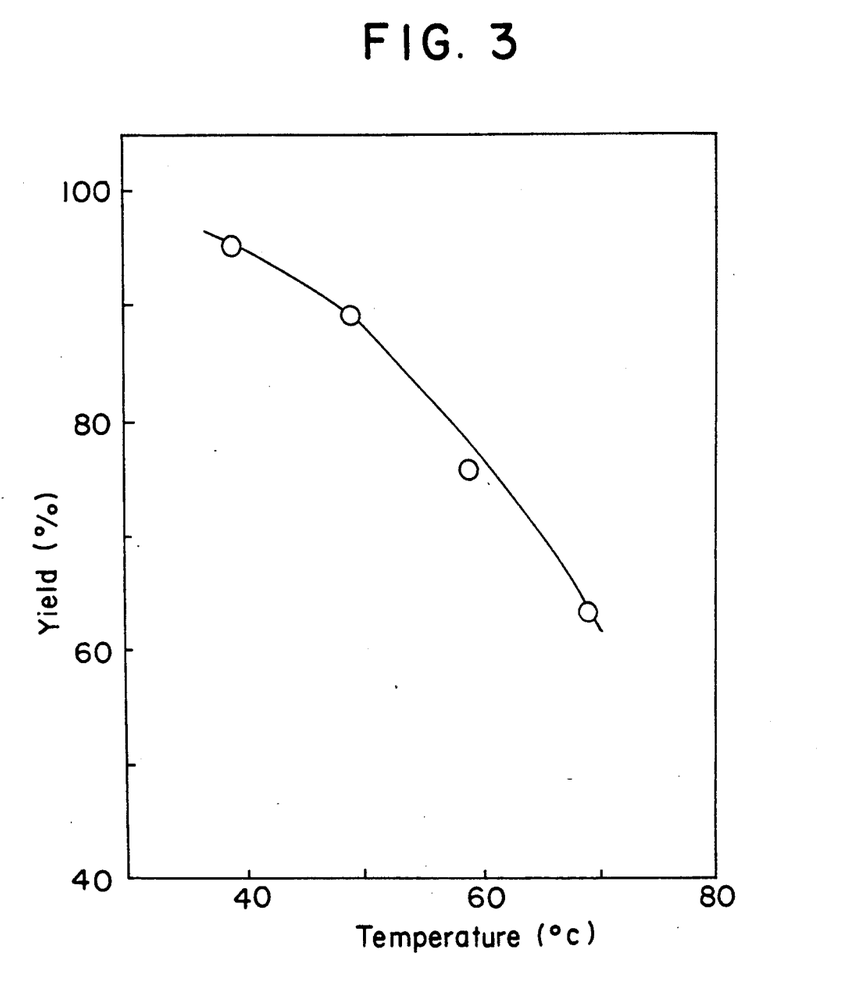
FIG. 3 plots the percentage yield of neodymium carbonate as a function of reaction temperature; the reaction occurring between neodymium oxide and carbon dioxide at 2800 psi and at a neodymium oxide to water ratio of 0.04. Reaction time was 1 hour.

The effect of temperature on the percentage yield was examined in the temperature range 25° C.–70° C. The range from 25° C. up to 31° C. being subcritical temperatures for carbon dioxide. The range from 31° C. and over being supercritical temperatures for carbon dioxide. The results are summarized at Table 4. The reaction conditions of interest were: $Nd_2O_3:H_2O=0.04$ w/w; time of reaction =1 hr; pressure= 2800 psi. Under supercritical conditions—namely, at temperatures over 31° C., the pressure also being supercritical, i.e. 2800 psi and held constant, it was observed that the higher the temperature, the lower the yield, as shown in FIG. 3. Even when the reaction is carried out below the critical temperature of carbon dioxide, i.e., 31° C., significant yields are obtained, see Table 4.

TABLE 4

Effect of Temperature on the Formation of Neodymium Carbonate: 2800 psi, 1 hr, and $[Nd_2O_3]/[H_2O] = 0.04$

| [$Nd_2O_3$] (g) | [$H_2O$] (ml) | Temperature (°C.) | Yield (%) |
| --- | --- | --- | --- |
| 1.0025 | 25.0 | 25.0 | 56.4 |
| 1.0062 | 25.0 | 30.0 | 82.6 |
| 1.0139 | 25.0 | 40.0 | 95.4 |
| 1.0081 | 25.0 | 50.0 | 89.3 |
| 1.0076 | 25.0 | 60.0 | 76.0 |
| 1.0058 | 25.0 | 70.0 | 63.3 |

Figure 4:
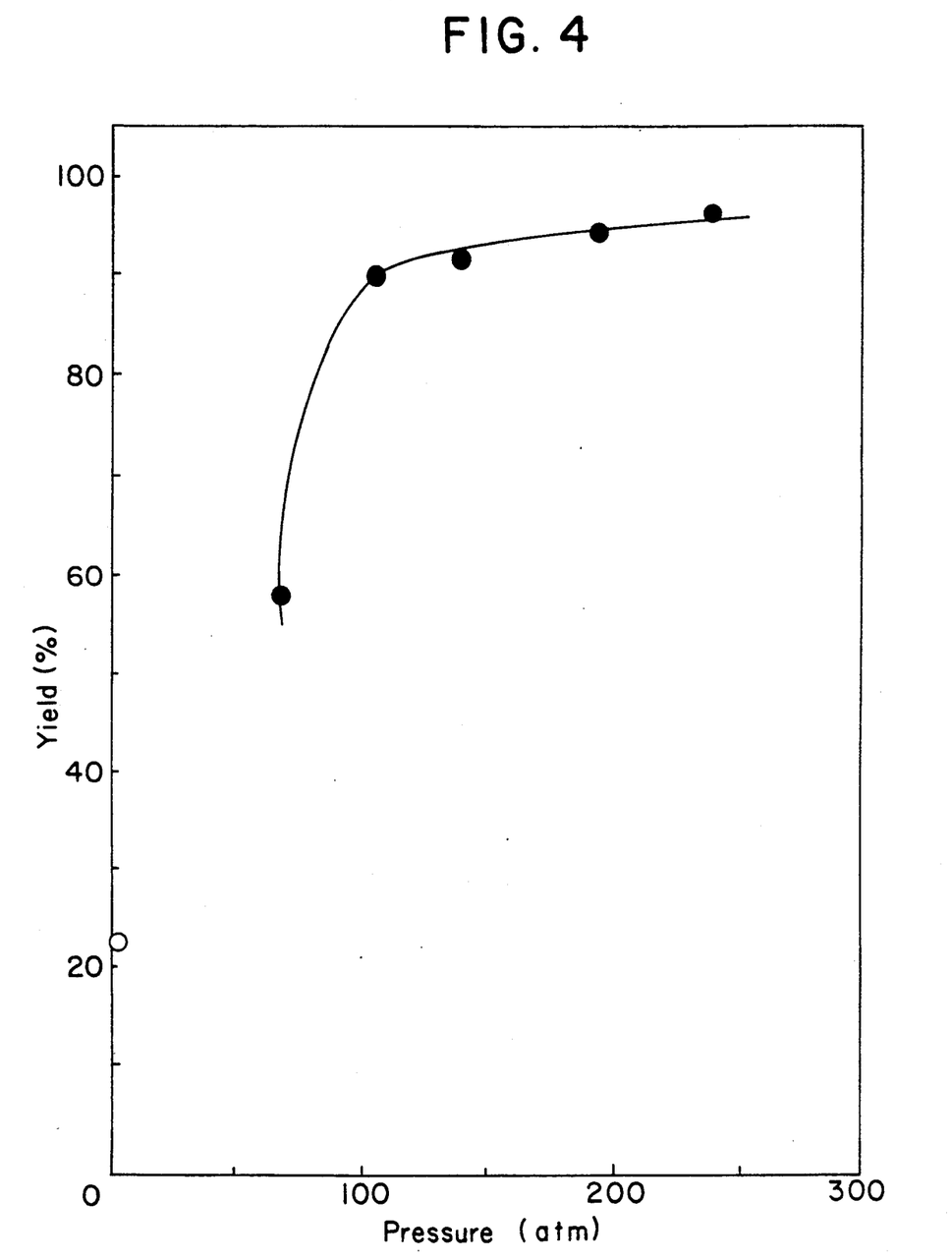
FIG. 4 graphs the percentage yield of neodymium carbonate versus pressure; the reaction occurring between neodymium oxide and carbon dioxide at a temperature of 40° C. and at a neodymium oxide to water ratio of 0.04. Reaction time was 1 hour.

The effect of pressure on the extent of formation of the neodymium carbonate was investigated in the range 68–240 atm, at a constant (supercritical) temperature of 40° C. and an initial $Nd_2O_3:H_2O$ ratio of 0.04 w/w for a reaction time of 1 hr. The results are shown in FIG. 4. Critical pressure for carbon dioxide is 72.9 atmospheres. The percentage yield was found to reach a near constant value at a pressure of 100 atm. The open circle in FIG. 4 shows that the yield was a little more than 20% when carbon dioxide gas was bubbled through a suspension of 1 g of $Nd_2O_3$ in 25 ml water at 40° C. at 1 atm for 1 hr.

The above results show that the extent of formation of the neodymium carbonate depends on the extent of dissolution of the carbon dioxide. The decrease in the yield when the temperature increases as shown in FIG. 3, is a direct consequence of the decrease in the dissolved carbon dioxide.

What is claimed is:

1. A process of forming a rare earth carbonate which comprises contacting a rare earth-bearing compound with carbon dioxide under supercritical conditions, said rare earth-bearing compound being effective to react to form a carbonate.

2. The process of claim 1, wherein the supercritical conditions include a temperature above about 31° C. and a pressure above about 72.9 atmospheres.

3. The process of claim 1 wherein the supercritical conditions include a temperature of about 40° C and a pressure of about 100 atmospheres.

4. The process of claim 1, wherein the rare earth bearing compound is a rare earth oxide or a rare earth hydroxide.

5. The process of claim 4 wherein the rare earth is lanthanum, neodymium, samarium, europium, gadolinium, dysprosium, holmium, promethium, thulium or lutetium.

6. The process of claim 4 wherein the rare earth oxide or rare earth hydroxide is obtained from monazite, bastnasite, xenotime, or uranium mining tailings.

7. A process for the separation of rare earth compounds from a mixture containing at least one rare earth oxide or hydroxide which will react to form at least one rare earth carbonate, and at least one rare earth oxide or hydroxide which will not react to form at least one rare earth carbonate which comprises:
   (a) contacting the mixture with carbon dioxide under supercritical conditions to form a resultant mixture containing at least one rare earth carbonate; and
   (b) treating the resultant mixture with a dilute acid to solubilize the at least one rare earth carbonate.

8. The process of claim 7 further comprising:
   (c) separating the solubilized at least one rare earth carbonate from solid components in the resultant mixture.

9. The process of claim 8 wherein the separation technique includes ion exchange or solvent extraction.

10. The process of claim 7 wherein the mixture is derived from monazite, bastnasite, xenotime or uranium mining tailings.

11. The process of claim 7 wherein the supercritical conditions include a temperature above about 31° C. and a pressure above about 72.9 atmospheres.

12. The process of claim 7 wherein the supercritical conditions include a temperature of about 40° C. and a pressure of about 100 atmospheres.

13. The process of claim 7 wherein the rare earth in the at least one rare earth oxide or hydroxide which will react to form at least one rare earth carbonate is lanthanum, neodymium, samarium, europium, gadolinium, dysprosium, holmium, promethium, thulium, or lutetium.

14. The process of claim 7 wherein the rare earth in the at least one rare earth oxide or hydroxide which will not react to form at least one rare earth carbonate is praseodymium, terbium, erbium, ytterbium or cerium.

15. A process for the separation of a first rare earth compound, wherein the first rare earth is in an oxidation state of no greater than +3 and is in admixture with a second rare earth compound or a compound of yttrium, titanium, zirconium or an actinide wherein the second rare earth or said yttrium, titanium, zirconium or actinide is in an oxidation state of greater than +3, which comprises contacting the admixture with carbon dioxide under supercritical conditions to form a carbonate with only the first rare earth.

16. A process for the separation of rare earth compounds from a mixture, said mixture containing at least one rare earth oxide or hydroxide and at least one compound of yttrium, titanium, zirconium or an actinide which comprises:
 (a) contacting said mixture with carbon dioxide under supercritical conditions to form a rare earth carbonate from said at least one rare earth oxide or hydroxide, said at least one compound of yttrium, titanium, zirconium or an actinide not forming a carbonate; and
 (b) solubilizing said rare earth carbonate with a dilute acid, said at least one compound of yttrium, titanium, zirconium or an actinide not being solubilized.

17. The process of claim 16 wherein said actinide is thorium.

18. The process of claim 16 wherein said yttrium, titanium, zirconium or actinide is in an oxidation state of +4.

* * * * *